(12) United States Patent
Andersson et al.

(10) Patent No.: US 11,981,193 B2
(45) Date of Patent: May 14, 2024

(54) ELECTRICAL DRIVE AXLE FOR A VEHICLE

(71) Applicant: BorgWarner Sweden AB, Landskrona (SE)

(72) Inventors: Isak Andersson, Kvidinge (SE); Ted Brink, Flyinge (SE)

(73) Assignee: BORGWARNER SWEDEN AB (SE)

(*) Notice: Subject to any disclaimer, the term of this patent is extended or adjusted under 35 U.S.C. 154(b) by 0 days.

(21) Appl. No.: 17/701,111

(22) Filed: Mar. 22, 2022

(65) Prior Publication Data
US 2022/0305893 A1    Sep. 29, 2022

(30) Foreign Application Priority Data

Mar. 24, 2021    (SE) .................................. 2150344-6

(51) Int. Cl.
| | |
|---|---|
| *B60K 1/00* | (2006.01) |
| *B60K 6/445* | (2007.10) |
| *B60K 17/02* | (2006.01) |
| *B60K 17/16* | (2006.01) |
| *B60K 23/04* | (2006.01) |
| *F16D 48/02* | (2006.01) |
| *F16H 48/22* | (2006.01) |
| *F16H 48/36* | (2012.01) |

(52) U.S. Cl.
CPC ................ *B60K 1/00* (2013.01); *B60K 6/445* (2013.01); *B60K 23/04* (2013.01); *F16D 25/14* (2013.01); *F16H 48/22* (2013.01); *F16H 48/36* (2013.01); *B60K 2001/001* (2013.01); *B60K 17/16* (2013.01); *B60K 2023/043* (2013.01); *F16H 2048/364* (2013.01)

(58) Field of Classification Search
CPC .......... B60K 1/00; B60K 23/04; B60K 17/16; B60K 2001/001; B60K 2023/043; B60K 6/445; F16D 25/14; F16H 48/00–2048/426
See application file for complete search history.

(56) References Cited

U.S. PATENT DOCUMENTS

| | | | |
|---|---|---|---|
| 5,069,657 A * | 12/1991 | Taniguchi | ............... F16H 57/08 192/48.619 |
| 5,310,388 A | 5/1994 | Okcuoglu et al. | |
| 5,964,126 A | 10/1999 | Okcuoglu | |

(Continued)

FOREIGN PATENT DOCUMENTS

| | | |
|---|---|---|
| DE | 102004058984 A1 | 6/2006 |
| DE | 102008040172 A1 | 1/2010 |

(Continued)

OTHER PUBLICATIONS

Extended European Search Report dated Aug. 10, 2022; Application No. 22164068.3-1012; Applicant: BorgWarner Sweden AB ; 7 pages.

(Continued)

*Primary Examiner* — Tinh Dang
(74) *Attorney, Agent, or Firm* — Dilworth IP, LLC

(57) ABSTRACT

An electrically driven vehicle axle is provided, including an electrical machine, a left drive shaft, a right drive shaft, a first clutch connecting the electrical machine to the left drive shaft and a second clutch connecting the electrical machine to the right drive shaft. The first and second clutches are arranged concentrically.

19 Claims, 4 Drawing Sheets

(56) References Cited

U.S. PATENT DOCUMENTS

| | | | |
|---|---|---|---|
| 6,499,578 B1 * | 12/2002 | Kundermann | F16D 48/02 |
| | | | 192/48.618 |
| 9,657,826 B1 | 5/2017 | Morgan | |
| 2003/0037977 A1 | 2/2003 | Tatara et al. | |
| 2006/0079369 A1 | 4/2006 | Mohan et al. | |
| 2014/0323259 A1 | 10/2014 | Sugiyama et al. | |
| 2015/0057124 A1 | 2/2015 | Pump | |
| 2015/0224867 A1 | 8/2015 | Nett et al. | |
| 2016/0207396 A1 * | 7/2016 | Pritchard | F16H 3/44 |
| 2018/0209489 A1 | 7/2018 | Yamaguchi et al. | |
| 2019/0344656 A1 | 11/2019 | Obergasser et al. | |
| 2021/0123487 A1 * | 4/2021 | Hirata | B60L 15/2054 |

FOREIGN PATENT DOCUMENTS

| | | | | |
|---|---|---|---|---|
| DE | 102010023840 A1 * | 12/2011 | | F16D 21/00 |
| DE | 102018124034 A1 * | 7/2019 | | |
| DE | 102018117939 A1 * | 1/2020 | | |
| WO | 2020099012 A1 | 5/2020 | | |

OTHER PUBLICATIONS

Swedish Search Report dated Oct. 13, 2021 ; Application No. 2150344-6; Applicant: BorgWarner Sweden AB; 3 pages.

\* cited by examiner

ELECTRICAL DRIVE AXLE FOR A VEHICLE

This application claims the benefit of Swedish Application No. SE 2150344-6 filed Mar. 24, 2021.

TECHNICAL FIELD

The present invention relates to an electrical drive axle for a vehicle. In particular, the present invention relates to an electrical axle allowing torque vectoring between the left and right wheel.

BACKGROUND

In the global effort to develop electrically driven vehicles numerous solutions have been presented addressing various objects such as reduced power consumption, compactness, improved driving performance, cost reduction, to name a few.

One suggested electric driveline is to have separately driven axles in order to allow for selective two-wheel drive and four-wheel drive, where in particular the rear axle of the vehicle is electrically driven. To improve yaw control during acceleration and deceleration of the vehicle the rear axle may be provided with torque vectoring functionality, i.e. the possibility to control the individual torque acting on the left and right wheel, respectively.

The drive torque for the rear axle is provided by means of an electrical machine which applies the desired driving torque as input to a differential having a first drive shaft connected to the left rear wheel, and a second drive shaft connected to the right rear wheel. In order to enable torque vectoring, additional gear trains are added to the differential in order to shuffle torque between the first and second drive shafts.

Another solution for allowing torque vectoring to an electrically driven rear axle is to have a first electrical machine driving the first drive shaft, and a second electrical machine driving the second drive shaft. By independent control of these two electrical machines it is possible to adjust the drive torque supplied to the respective wheels. However, the need for two electrical machines greatly increases complexity and cost.

In view of the above-mentioned examples of prior art there is need for an improved electrically driven axle which requires a single electrical machine without the need for additional gear trains.

SUMMARY

Accordingly, the present invention preferably seeks to mitigate, alleviate or eliminate one or more of the above-identified deficiencies in the art and disadvantages singly or in any combination and solves at least the above-mentioned problems by providing a vehicle axle according to the appended claims.

According to a first aspect an electrically driven vehicle axle is provided. The vehicle axle comprises an electrical machine, a left drive shaft, a right drive shaft, a first clutch connecting the electrical machine to the left drive shaft and a second clutch connecting the electrical machine to the right drive shaft. The first and second clutches are arranged concentrically.

The first and second clutches may be axially overlapping. The first and second clutches may be arranged at different radius. The first and second clutches may be axially overlapping, but radially separated. This allows for a very compact solution, especially in the axial direction of the vehicle axle. Hence, more axial space is available for other vehicle axle components, such as the electrical machine.

The first and second clutches may be hydraulically actuated disc clutches. This is advantageous in that it provides for improved torque control, increased response time and superior accuracy.

Each disc clutch may be actuated by a respective piston. Preferably, each piston is radially aligned with the associated clutch, i.e. arranged at a radius coinciding with a radius of the clutch. Generally, the radial extension of the clutch is greater than the radial extension of the associated piston. Preferably, the piston extends between an inner radius and an outer radius, and the clutch extends between an inner radius and an outer radius. At least the outer radius of the piston is arranged radially outwards of the inner radius of the clutch. Preferably, the inner radius of the clutch is smaller than the inner radius of the piston, and the outer radius of the clutch is greater than the outer radius of the piston.

The pistons may be axially overlapping. The pistons may be radially separated. Preferably, the pistons may be axially overlapping, but radially separated.

The disc clutches may be axially supported by at least one bearing. The bearing may be radially aligned with the associated clutch, i.e. arranged at a radius coinciding with a radius of the clutch. Generally, the radial extension of the clutch is greater than the radial extension of the associated bearing. Preferably, the bearing extends between an inner radius and an outer radius, and the clutch extends between an inner radius and an outer radius. At least the outer radius of the bearing is arranged radially outwards of the inner radius of the clutch. Preferably, the inner radius of the clutch is smaller than the inner radius of the bearing, and the outer radius of the clutch is greater than the outer radius of the bearing.

Radial aligning of the pistons and/or axial bearings with the clutches reduces the risk for deflections of the vehicle axle assembly, which are due to the high forces required for the desired torque transfer. It has also been proven that the concept of radial alignment of axial bearings and/or actuation pistons reduces weight and response time.

The vehicle axle may further comprise an input shaft being provided with a first set of discs arranged radially inwards to form discs of the first clutch, and a second set of discs arranged radially outwards to form discs of the second clutch. By using a common input shaft for the two clutches the complexity of the vehicle axle is greatly reduced.

The electrical machine may be in driving connection with said input shaft. This allows for concentric mounting of the electrical machine onto the vehicle axle, reducing the need for additional gear trains.

Each clutch may be provided with a return spring for disconnecting the left and right drive shaft from the electrical machine. Automatic disc separation is thereby achieved for both clutches.

Each clutch may be controlled by a separate hydraulic actuator. This enables individual torque control for each clutch which allows for efficient and accurate torque vectoring of the vehicle axle.

The first and second clutches may be arranged in a common housing. This is advantageous in that all high pressure hydraulics may be arranged in a single housing, thereby reducing the complexity of the vehicle axle.

The housing may be in fluid connection with an external oil reservoir. It is thus possible to control the amount of hydraulic fluid inside the common housing for reducing losses during disconnect mode of the clutches.

The oil reservoir may be provided with an oil inlet receiving oil from the first and second clutches, and an oil outlet for distributing oil to the first and second clutches. Efficient distribution to and from the clutches is thereby achieved.

The oil outlet may be provided with a shut-off valve for automatically closing said oil outlet when the first and second clutches are in a disconnected mode. Automatic drainage of the housing is thereby provided According to a second aspect a vehicle is provided. The vehicle comprises a vehicle axle according to the first aspect.

According to a third aspect a method for controlling the drive torque to a vehicle axle is provided. The method comprises i) determining a desired torque to a left drive shaft and a right drive shaft of the vehicle axle, ii) activating an electrical machine of the vehicle axle, and iii) actuating a first clutch of the vehicle axle by applying a pressure corresponding to the desired torque of the left drive shaft and actuating a second clutch of the vehicle axle by applying a pressure corresponding to the desired torque of the right drive shaft.

BRIEF DESCRIPTION OF THE DRAWINGS

The invention will be described in further detail below with reference to the accompanying drawings, in which.

DETAILED DESCRIPTION

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended claims. Furthermore, the terminology used in the detailed description of the particular embodiments illustrated in the accompanying drawings is not intended to be limiting of the invention.

Figure 1:
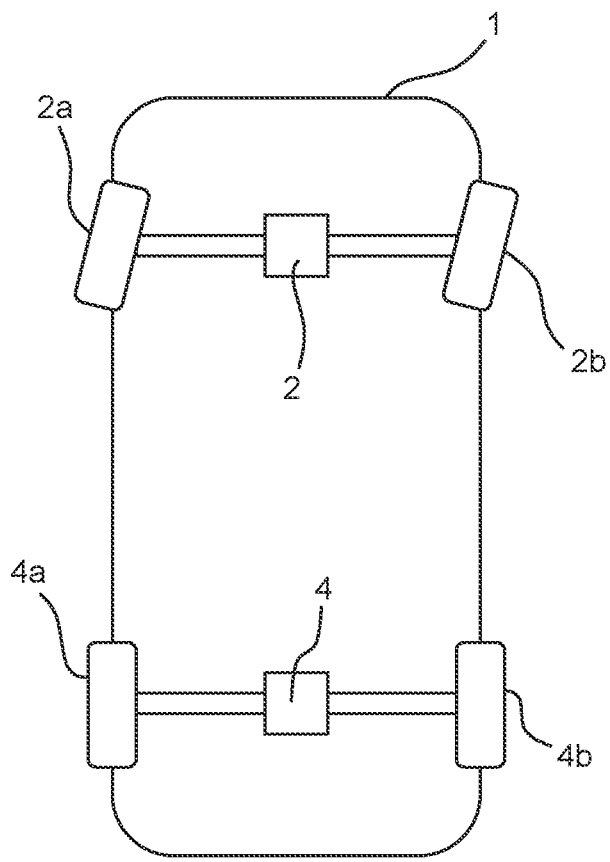
FIG. 1 is a schematic view of a vehicle according to an embodiment.

Starting in FIG. 1, a vehicle 1 is schematically shown. The vehicle 1 is provided with a front axle 2 which is configured to provide drive torque to left and right front wheels 2a-b, and a rear axle 4 which is configured to provide drive torque to left and right rear wheels 4a-b. Although not described further herein, the front axle 2 may be driven by a combustion engine (not shown) or by an electrical machine (not shown).

As will be explained in the following, by activation of the rear axle 4 four-wheel drive, AWD, or rear-wheel drive, RWD, of the vehicle 1 is provided. The rear axle 4 is also capable of providing torque vectoring.

Figure 2:
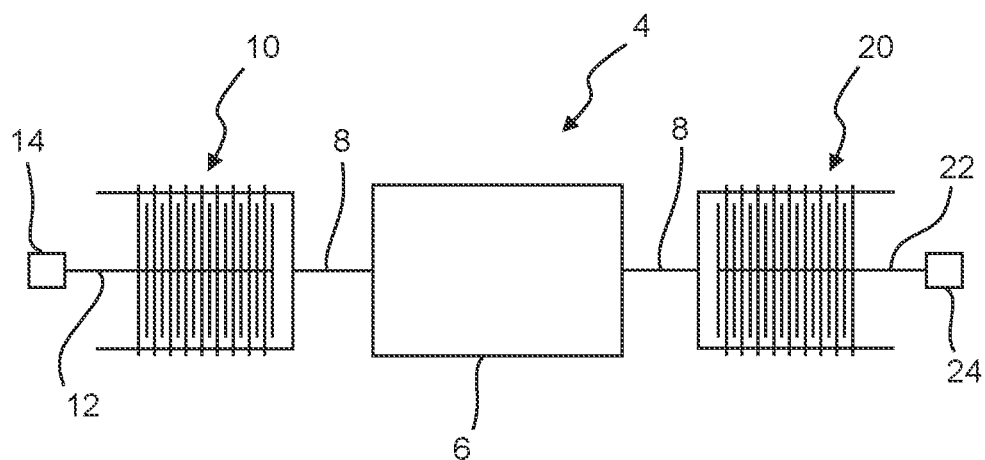
FIG. 2 is a schematic view of a vehicle axle according to an embodiment.

The general construction of the rear axle 4 is shown schematically in FIG. 2. The vehicle axle 4 comprises an electrical machine 6, preferably arranged concentrically on the vehicle axle 4. The electrical machine 6 has an output shaft 8 which rotates upon activation of the electrical machine 6. Optionally, a reduction gear (not shown) is provided to reduce the rotational speed of the output shaft 8.

The output shaft 8 forms an input shaft to two clutches 10, 20. The first clutch 10 has an output shaft 12 which is connected to a left drive shaft 14. The left drive shaft 14 is providing drive torque to the left rear wheel 4a (see FIG. 1). The second clutch 20 has an output shaft 22 which is connected to a right drive shaft 24. The right drive shaft 24 is providing drive torque to the right rear wheel 4b (see FIG. 1).

Figure 3:
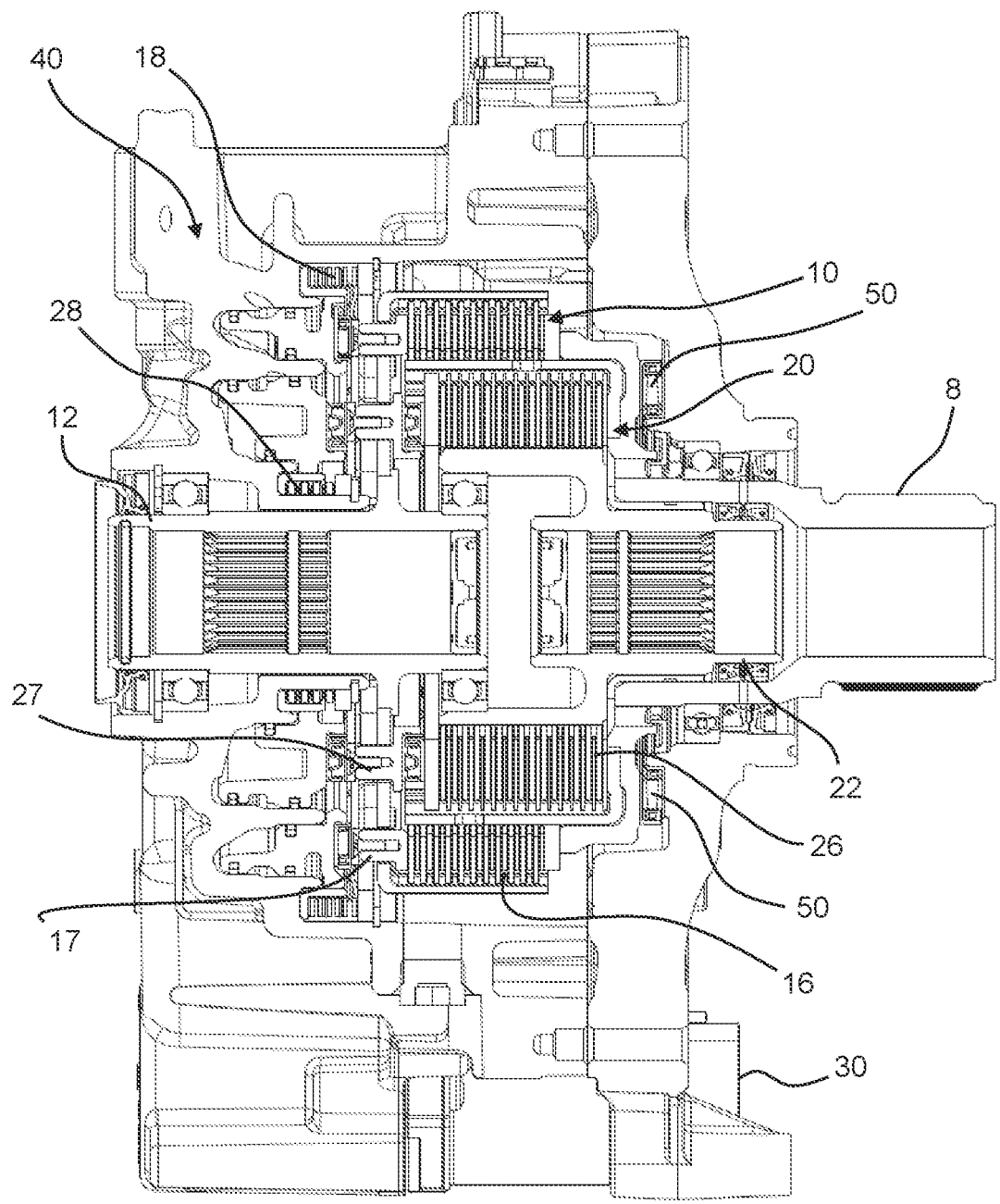
FIG. 3 is a cross-sectional view of parts of a vehicle axle according to an embodiment.

Now turning to FIG. 3, an example of parts of vehicle axle 4 is shown. Although not shown in FIG. 3, the electrical machine 6 is driving the shaft 8 which forms an output shaft of the electrical machine 6, as well as a common input shaft for both clutches 10, 20.

Each clutch 10, 20 comprises an output shaft 12, 22 which is selectively connected to the input shaft 8 by a set of hydraulically actuated discs 16, 26. Upon actuation of the first clutch 10, the set of discs 16 is compressed such that torque from the input shaft 8 is transferred to the output shaft 12. In a similar manner, upon actuation of the second clutch 20, the set of discs 26 is compressed such that torque from the input shaft 8 is transferred to the output shaft 26.

The input shaft 8 is hollow in order to allow the output shaft 22 of the second clutch 20 to extend through towards the right wheel 4b. The output shaft 12 of the first clutch 10 extends in the opposite direction towards the left wheel 4a.

The first and second clutches 10, 20 are arranged concentrically, radially outwards the output shafts 12, 22. In particular, the set of discs 16 of the first clutch 10 is arranged radially outwards of the set of discs 26 of the second clutch 20. As can be seen in FIG. 3 the set of discs 16 of the first clutch 10 is arranged radially outside the input shaft 8, while the set of discs 26 of the second clutch 20 is arranged radially inside the input shaft 8. The clutches 10, 20, and in particular the set of discs 16 of the first clutch 10 and the set of discs 26 of the second clutch 20 overlap in the axial direction, preferably by at least 50%.

The first clutch 10 comprises a piston 17 and a return spring 18. The piston 17 compresses the set of discs 16 upon application of a hydraulic pressure. The return spring 18 acts against the force of the piston 17, causing automatic separation of the set of discs 16 when the piston 17 is idle.

In a similar manner the second clutch 20 comprises a piston 27 and a return spring 28. The piston 27 compresses the set of discs 26 upon application of a hydraulic pressure. The return spring 28 acts against the force of the piston 27, causing automatic separation of the set of discs 26 when the piston 27 is idle.

The pressure being applied to the pistons 17, 27 is controlled by two separate actuators 30 (only one actuator is shown in FIG. 3).

The first clutch 10 and the second clutch 20 are arranged in a common housing 40. The housing 40 accommodates the required high pressure hydraulics for both clutches 20, 30.

As can be seen in FIG. 3 each piston 17, 27 is radially aligned with the associated clutch 10, 20, and in particular with the set of discs 16, 26 of the respective clutch 10, 20. In other words, each piston 17, 27 is arranged at a radius coinciding with a radius of the clutch. As the radial extension of the clutch is preferably greater than the radial extension of the associated piston, the clutch 10, 20 is radially overlapping the associated piston 17, 27. Hence, at least an outer radius of the piston 17, 27 is arranged radially outwards of an inner radius of the clutch 10, 20. In the embodiment shown in FIG. 3 the inner radius of the clutch is smaller than the inner radius of the piston, and the outer radius of the clutch is greater than the outer radius of the piston.

The pistons 17, 27 are axially overlapping, but radially separated.

As is further shown in FIG. 3 the input shaft 8 is axially supported by a bearing 50, positioned between the housing 40 and the input shaft 8. The axial bearing 50 allows the input shaft 8 to rotate relative the housing 40, and accommodates the axial forces transmitted through the clutches 10, 20. Hence, the disc clutches are axially supported by the bearing 50. For improved force accommodation the axial bearing 50 is radially positioned somewhere between the outer radius of the first clutch 10, and the inner radius of the second clutch 20. Hence, the axial bearing 50 is radially aligned with the clutches 10, 20.

Figure 4:
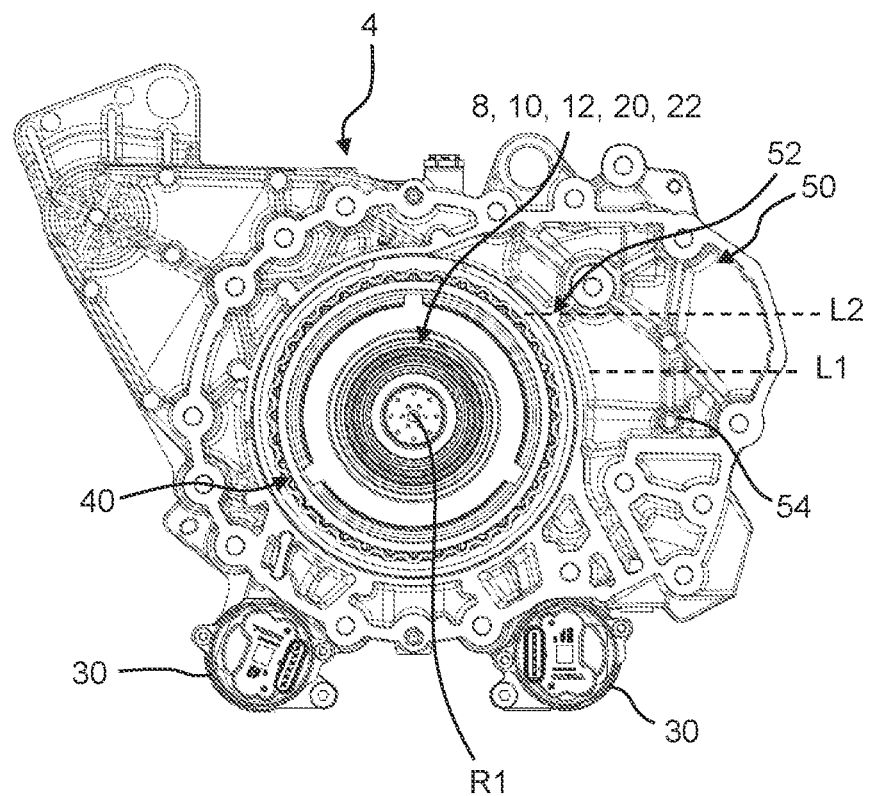
FIG. 4 is another cross-sectional view of a vehicle axle according to an embodiment.

Further details of a vehicle axle 4 is shown in FIG. 4. The input shaft 8, the clutches 10, 20, and the output shafts 12, 22 are all concentrically arranged around a central axis R1. The housing 40 surrounds the clutches 10, 20, and is in fluid communication with a reservoir 50 arranged radially outside the housing 40. Clutch fluid, such as cooling and lubrication oil, is allowed to flow to and from the reservoir 50. During operation of the vehicle axle 4, i.e. when the clutches 10, 20 are in a connected mode, rotation of the set of disc 16, 26 will throw the clutch fluid by a centrifugal force. The clutch fluid will exit the housing 40 through an open channel 52 that is arranged at the upper part of the housing 40. The open channel 52 extends into the reservoir 50, which thereby receives the clutch fluid from the housing 40. A valve 54 is arranged at the bottom part of the reservoir 50. The valve 54 is a shut-off valve which opens automatically when the clutches 10, 20 are in a connected mode such that during normal operation, clutch fluid will circulate from the housing 40 to the reservoir 50 via the channel 52, and back to the housing 40 through the open valve 54. The fluid level inside the reservoir 50 during normal operation is indicated by the level L1.

When the clutches 10, 20 are disengaged the valve 54 is automatically closed, such that clutch fluid in the reservoir 50 is prevented from returning to the housing 40. As the discs will still rotate the clutch fluid inside the housing 40 will be thrown back to the reservoir 50 whereby the housing will be drained. The fluid level of the reservoir 50 will thereby increase, as indicated by level L2. This automatic drainage reduces drag losses during disconnect mode.

Figure 5:
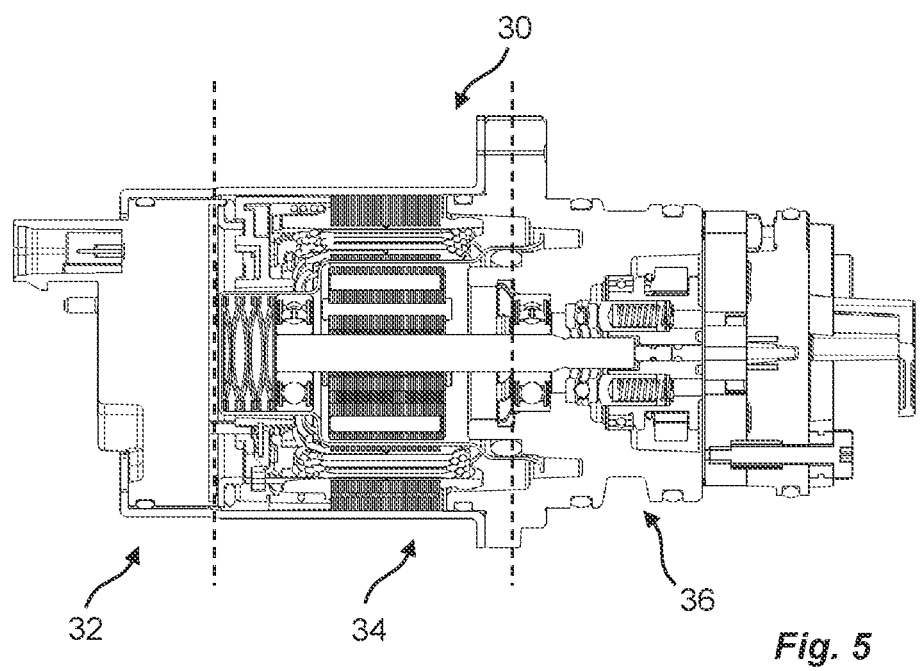
FIG. 5 is a cross-sectional view of an actuator of a vehicle axle according to an embodiment.

Now turning to FIG. 5 details of the actuators 30 will be described. As explained earlier, each clutch 10, 20 is controlled by a separate actuator 30. For the embodiments described above, requiring two actuators 30, these are preferably identical.

The actuator 30 comprises an electronic control unit 32, an electrical motor 34, and a pump 36. All these components are assembled as a fully integrated device. The electronic control unit 32 is configured to control the operation of the electrical motor 34 according to functional safety requirements and preferably by applying cyber security and encryption of all control signals. The electrical motor, preferably in the form of an BLDC is driving the pump 36, preferably in the form of a centrifugal pump.

Figure 6:
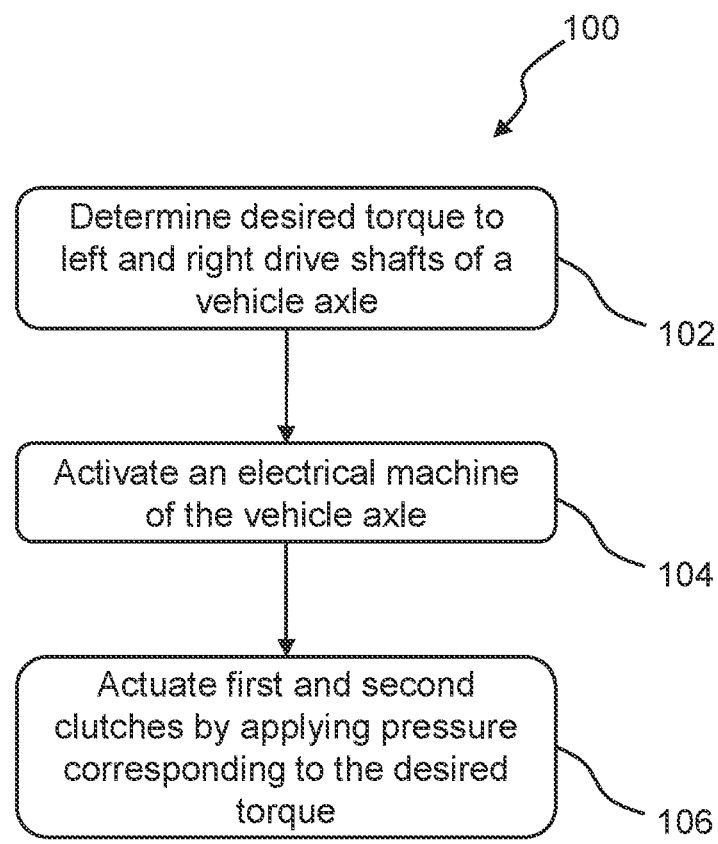
FIG. 6 is a schematic view of a method for controlling drive torque according to an embodiment.

Now turning to FIG. 6, a method 100 for controlling the drive torque to a vehicle axle 4 is provided. The method comprises a first step 102 of determining a desired torque to a left drive shaft 14 and a right drive shaft 24 of the vehicle axle 4. This step 102 is preferably performed by monitoring driving characteristics of the associated vehicle 1, and to calculate optimum torque amount. In a step 104, which in normal conditions is performed simultaneously as step 102, the electrical machine 6 of the vehicle axle 4 is controlled to a desired speed. In step 106 a first clutch 10 of the vehicle axle 4 is actuated by applying a pressure corresponding to the desired torque of the left drive shaft 14 and a second clutch 20 of the vehicle axle 4 is actuated by applying a pressure corresponding to the desired torque of the right drive shaft 24.

It should be mentioned that the inventive concept is by no means limited to the embodiments described herein, and several modifications are feasible without departing from the scope of the invention as defined in the appended claims.

The invention claimed is:

1. An electrically driven vehicle axle, comprising an electrical machine, a left drive shaft, a right drive shaft, a first clutch connecting the electrical machine to the left drive shaft and a second clutch connecting the electrical machine to the right drive shaft, wherein the first and second clutches are arranged concentrically, and axially overlapping, and configured to independently control torque of the left drive shaft and the right drive shaft, respectively.

2. The vehicle axle according to claim 1, wherein the first and second clutches are arranged at different radius.

3. The vehicle axle according to claim 1, wherein the first and second clutches are hydraulically actuated disc clutches.

4. The vehicle axle according to claim 1, further comprising two pistons, wherein each clutch is actuated by a respective piston.

5. The vehicle axle according to claim 4, wherein each piston is radially aligned with the associated clutch.

6. The vehicle axle according to claim 4, wherein the pistons are axially overlapping.

7. The vehicle axle according to claim 4, wherein the pistons are arranged at different radius.

8. The vehicle axle according to claim 1, wherein the clutches are axially supported by at least one bearing.

9. The vehicle axle according to claim 8, wherein the at least one bearing is radially aligned with at least one of the clutches.

10. The vehicle axle according to claim 1, further comprising an input shaft being provided with a first set of discs arranged radially inwards to form discs of the first clutch, and a second set of discs arranged radially outwards to form discs of the second clutch.

11. The vehicle axle according to claim 10, wherein the electrical machine is in driving connection with said input shaft.

12. The vehicle axle according to claim 1, wherein each clutch is provided with a return spring for disconnecting the left and right drive shaft from the electrical machine.

13. The vehicle axle according to claim 1, wherein each clutch is controlled by a separate hydraulic actuator.

14. The vehicle axle according to claim 1, wherein the first and second clutches are arranged in a common housing.

15. The vehicle axle according to claim 14, wherein said housing is in fluid connection with an external oil reservoir.

16. The vehicle axle according to claim 15, wherein said oil reservoir is provided with an oil inlet receiving oil from the first and second clutches, and an oil outlet for distributing oil to the first and second clutches.

17. The vehicle axle according to claim 16, wherein the oil outlet is formed by a shut-off valve for automatically closing when the first and second clutches are in a disconnected mode.

18. A vehicle, comprising a vehicle axle comprising an electrical machine, a left drive shaft, a right drive shaft, a first clutch connecting the electrical machine to the left drive shaft and a second clutch connecting the electrical machine to the right drive shaft, wherein the first and second clutches are arranged concentrically, and axially overlapping, and configured to independently control torque of the left drive shaft and the right drive shaft, respectively.

19. A method for controlling drive torque to a vehicle axle, comprising:
- determining a desired torque to a left drive shaft and a right drive shaft of the vehicle axle,
- activating an electrical machine, and
- actuating a first clutch, connecting the electrical machine to the left drive shaft, by applying a pressure corresponding to the desired torque of the left drive shaft and actuating a second clutch, connecting the electrical machine to the right drive shaft, by applying a pressure corresponding to the desired torque of the right drive shaft, wherein the first and second clutches are arranged concentrically, and axially overlapping, and configured to independently control torque of the left drive shaft and the right drive shaft, respectively.

\* \* \* \* \*